United States Patent Office 3,316,292
Patented Apr. 25, 1967

3,316,292
FLUORODINITROALKYL ESTERS OF MONOCARBOXYLIC ACIDS AND THEIR PREPARATION
Otto S. Schaeffler, Arcadia, Calif., assignor to Aerojet-General Corporation, Azusa, Calif., a corporation of Ohio
No Drawing. Filed July 27, 1962, Ser. No. 214,447
18 Claims. (Cl. 260—486)

This invention relates to novel fluorodinitroalkyl esters of aliphatic monocarboxylic acids and to their method of preparation.

It is an object of this invention to prepare novel esters of aliphatic monocarboxylic acids. It is another object of this invention to prepare these esters in a novel manner. In still another aspect it is an object of this invention to prepare novel esters from aliphatic monocarboxylic acids which are useful as high energy plasticizers in solid propellant compositions. It is still another object of this invention to prepare esters of unsaturated monocarboxylic acids which may be polymerized to form binders which are useful in solid propellant compositions. These and other objects of my invention will be apparent from the detailed description which follows.

The novel fluorodinitroalkyl esters of aliphatic monocarboxylic acids of this invention have the following generic formulas:

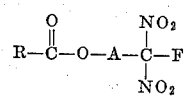

wherein A is an alkylene radical and preferably a lower alkylene radical such as methylene, ethylene and decamethylene. Preferably A has from 1 to about 10 carbon atoms and may be branched or straight-chained. In the above formula R is a lower alkyl or lower alkenyl radical having from 1 to about 10 carbon atoms. Thus, R may be methyl, ethyl, isopropyl, decyl, vinyl, propenyl, allyl, 1-pentenyl, etc. R may be branched or straight-chained.

The novel esters of the above formula are prepared in accordance with the following general reaction equation:

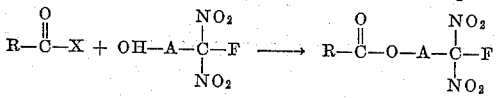

wherein A and R are defined above. X in the above reaction equation is selected from the group consisting of halogen and hydroxy. Preferred halogens are those having a molecular weight from 19 to 127, inclusive, i.e., fluorine, chlorine, bromine and iodine.

The preferred acid or acid halide reactants of this invention contain ethylenic unsaturation since these esters may be polymerized to form high polymers useful as propellant binders.

It is sometimes desirable when using unsaturated acids or acid halides that the esterification reaction be carried out in the presence of an effective amount; i.e., from about 0.05 percent to about 3 percent by weight of the reactants, of a polymerization inhibitor such as hydroquinone or methylene blue.

Illustrative of the acids, acid halides and alcohols which can be used in the above reaction are acetic acid, butyric acid, propionyl chloride, acrylic acid, methacrylic acid, pentenoic acid, 2-fluoro-2,2-dinitro ethanol, 3-fluoro-3,3-dinitro propanol and 5-fluoro-5,5-dinitro pentanol.

In the above reaction the aliphatic monocarboxylic acid or acid dihalide and the dinitrofluoro alcohol may be employed in any amount. Normally stoichiometrically equivalent amounts are preferred since this results in the most complete utilization of the reactants. However, if desired, a stoichiometric excess of the aliphatic monocarboxylic acid or acid chloride may be used, the excess serving as a solvent for the dinitrofluoro alcohol. When excess aliphatic monocarboxylic acid or acid chloride is used as the solvent, it is normally used in amounts up to about twice that corresponding to a stoichiometric equivalent of the amount of dinitrofluoro alcohol present. Although the above reaction may be carried out over a wide temperature range, preferably the reaction is carried out at a temperature between about 0° C. and 125° C. since this produces better product yields while minimizing undesired side reactions.

It is to be understood that in the above reaction a condensation catalyst such as polyphosphoric acid or trifluoroacetic anhydride may be optionally employed. The use of such a condensation catalyst may sometime improve the ease of reaction. In fact the use of such a condensation catalyst is preferred in the above reaction when X is hydroxy; that is, when the acid is used rather than the acid chloride.

The above reaction can be carried out under any suitable pressure. Normally the reaction is run at atmospheric pressure since this is most convenient. The esters produced according to this invention are normally liquid and may be isolated in conventional manner by distillation, extraction and/or evaporation.

The examples which follow are presented only for purpose of illustration and should not be regarded as limitative of the invention in any way.

EXAMPLE I

Preparation of 2-fluoro-2,2-dinitroethyl acrylate from acrylyl chloride

Into a 100 ml. 3-necked flask fitted with a thermometer, condenser and nitrogen inlet tube were placed 7.7 grams of 2-fluoro-2,2-dinitroethanol, 4.5 grams of acrylyl chloride and 40 ml. of chloroform. The mixture was heated to 90–95° C. and held there overnight. Nitrogen was continuously swept through the mixture. As a result of the nitrogen sweep it appeared that all the solvent had been swept out of the reaction vessel. A pinch of methylene blue was added to the product before distillation. The distilled 2-fluoro-2,2-dinitroethyl acrylate product was found to have a boiling point of 38–40° C. at 0.3 mm. Hg.

A second preparation using acrylyl chloride as solvent was run, using the same set-up as in the previous example. In this reaction 7.7 grams of 2-fluoro-2,2-dinitroethanol and 9.0 grams of acrylyl chloride were used. The temperature was slowly raised to 90–95° C. and allowed to stand overnight. At the end of the overnight heating period the reaction was cooled down and swept out with nitrogen. The 2-fluoro-2,2-dinitroethyl acrylate had an index of refraction of 1.4361.

The 2-fluoro-2,2-dinitroethanol employed in the above example is prepared by the reaction of fluorine with 2,2-dinitroethanol or metal salts thereof as is more fully described in assignee's copending U.S. application Ser. No. 214,169, filed July 27, 1962.

EXAMPLE II

Preparation of 2-fluoro-2,2-dinitroethyl acrylate from acrylic acid

Into a 50 ml. 3-necked flask fitted with stirrer and thermometer were charged 4.75 grams of acrylic acid, 7.7 grams of 2-fluoro-2,2-dinitroethanol and 10.2 grams of polyphosphoric acid. While stirring, the mixture was heated to 60–70° C. for 3 hours. Without cooling the mixture was poured into 50 cc. ice water and stirred. The mixture was extracted three times with 18 ml. of methylene chloride. The combined exrtacts were then washed with 9 cc. of water and then washed four times method of producing the epoxide is to heat the halohydrin in the presence of a base. Any one of the bases ordinarily used for this purpose can be used herein, but it is generally preferred to use a hydroxide of an alkali metal or an alkaline earth metal, or similar metal hydroxides. Depending upon the reaction system, other basic compounds, such as the carbonates of the above metals, can also be used if desired. Organic bases, such as pyridine, while used in some cases, are ordinarily not desirable unless particularized conditions are employed, because they often tend to open the epoxide ring and thus reduce the yield of the desired epoxide.

The halohydrins of this invention are also advantageously utilized to produce the corresponding esters by reaction with an unsaturated carboxylic acid. Any unsaturated carboxylic acid can be used with these halohydrins to produce esters, including, for example, unsaturated monocarboxylic acids such as acrylic acid, methacrylic acid and crotonic acid, as well as unsaturated dicarboxylic acids, for instance, maleic acid and fumaric acid. Thus, there can be employed lower alkenoic acids and lower alkendioic acids. There may also be employed mixtures of unsaturated carboxylic acids, such as the fatty acids obtained from naturally occurring vegetable and marine drying and semi-drying oils. The anhydrides of the above acids can be substituted for the acids if so desired.

The esters produced from the halohydrins of this invention are particularly desirable in producing polyesters and other polymers, and their high halogen content provides unusual properties in such products. Homopolymers of these esters as well as their copolymers with other polymerizable monomers, such as methyl methacrylate, styrene and the like, are produced by free-radical initiated reactions using benzoyl peroxide and other such catalysts. The polymers obtained are useful as protective and decorative coatings on steel or other substrates, as well as in films and similar conventional applications for polymers of this general type. In many cases, the polymers obtained are self-extinguishing i.e., do not support a flame, this highly advantageous property being generally obtained in polymers containing about 50 mole percent or more of the esters of the invention.

In addition to providing polymeric compositions for coatings and other uses, the esters herein are also useful as plasticizers, for instance, they effectively plasticize poly(vinyl chloride) and similar materials being used for this purpose, in the same manner as known plasticizers for such materials.

The following examples illustrate the method and practice of producing the halohydrins by the method of the invention, but the invention should not be construed as being limited to their details. All parts and percentages throughout this specification are by weight unless otherwise specified.

EXAMPLE A

A three-liter, four-necked flask with a condenser, stirrer and thermometer was charged with 174 parts of allyl alcohol, 1600 parts of carbon tetrachloride, 235 parts of isopropyl alcohol, and 15 parts of ferric chloride hexahydrate. The mixture was heated to 69° C. and refluxed at that temperature for 21 hours. The solvent and unreacted allyl alcohol were distilled off and the product mixture was washed with water and distilled. Three hundred and eight (308) parts of 2,4,4,4-tetrachlorobutanol were recovered at 68° C.–74° C. at 0.55 to 0.65 mm. pressure. The product was identified by infrared and gas chromatographic analysis, as well as by preparation of derivatives such as the benzoate. The identification was confirmed by chemical analysis as follows:

Analysis (calculated for $C_4H_6Cl_4O$): Calculated, percent: C, 22.69; H, 2.85; Cl, 66.93. Found: C, 23.49; H, 3.06; Cl, 69.79.

EXAMPLE B

A two-liter, four-necked flask with condenser, stirrer and thermometer was charged with 144 parts of methallyl alcohol, 800 parts of carbon tetrachloride, 10 parts of ferric chloride hexahydrate, and 156 parts of isopropyl alcohol. The reaction mixture was heated to reflux at 71° C. and maintained at that temperature for 48 hours. The reaction mixture was then cooled, washed with water and dried. It was then distilled and after removal of the solvent and unreacted methallyl alcohol, 94 parts of product, 2-methyl-2,4,4-trichlorobutanol, were recovered at 73° C.–83° C. at 0.3 to 0.4 mm. of mercury pressure. The product was identified by infrared and gas chromatographic analysis.

EXAMPLE C

A flask was charged with 58 parts of allyl alcohol, 165 parts of carbon tetrabromide, 2.5 parts of ferric chloride hexahydrate and 78 parts of isopropyl alcohol. The mixture was heated to 90° C. and refluxed for 37 hours. After filtering, the reaction mixture was distilled and 2,4,4,4-tetrabromobutanol was recovered as the fraction boiling at 100° C.–125° C. at 0.15 to 0.2 mm. of mercury. Identification of the product was by infrared and gas chromatographic analysis, and was confirmed by chemical analysis.

EXAMPLE D

A flask was charged with 174 parts of allyl alcohol, 596 parts of 1,1,1-trichloroethane (methyl chloroform), 121 parts of butanol, and 15 parts of ferric chloride. The mixture was refluxed for 22 hours at 72° C.–73° C. Most of the solvent was then stripped off and the residue washed with water and extracted with diethyl ether. The ether layer was then dried over sodium sulfate, the ether evaporated and the crude product distilled. The desired product, 2,4,4-trichloropentanol, was obtained as the fraction boiling at 115° C.–118° C. at 10 mm. pressure. It was identified by infrared, gas chromatographic and chemical analysis.

The foregoing examples and other similar tests have demonstrated that the reaction of a carbon tetrahalide or an alkyl haloform as described herein takes place with unsaturated alcohols of the class described hereinabove and that the reaction can be carried out in the presence of any catalyst comprising the halide of any metal having two oxidation states which differ by one electron. While, as in the examples above, ferric chloride is usually used because it is readily available and easily handled, other catalysts of the class described, such as ferrous chloride, cupric chloride, cuprous chloride, and the like, are used in the same manner.

As discussed above, the halohydrins produced from the reactions as illustrated can be very advantageously utilized in producing esters by reaction with an unsaturated carboxylic acid or in producing epoxides by heating the halohydrin in the presence of a base. Because the halogens contained in the halohydrin are not affected and provide properties which are especially desirable, the epoxides produced can be used to make epoxy resins of particular value. The following example illustrates the manner in which epoxides are formed from the halohydrins. In the example set forth, the halohydrin used is that produced in Example A above.

EXAMPLE E

A solution of 4 parts of sodium hydroxide and 100 parts of water was added to 20 parts of 2,4,4,4-tetrachlorobutanol and heated to 60° C. for 37 hours, at which time the pH of the solution was about 8.5. The reaction mixture was extracted with diethyl ether and the ether evaporated from the organic layer, leaving 16 parts of 85 percent pure 4,4,4-trichloro-1,2-epoxybutane, as identified by gas chromatographic analysis. Redistilla- 12. The method of preparing compounds of the formula

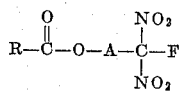

which comprises reacting in the presence of a condensation catalyst a compound of the formula

with an alkanol of the formula

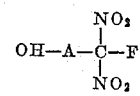

wherein in the above formulae A is a lower alkylene radical, R is selected from the group consisting of alkyl and lower alkenyl radicals, and X is selected from the group consisting of halogen and hydroxy.

13. The method of claim 12 wherein the condensation catalyst is polyphosphoric acid.

14. The method of claim 12 wherein the reaction is carried out in the presence of an inert solvent.

15. The method of claim 12 wherein the reaction is carried out in the presence of a halohydrocarbon solvent.

16. The method of preparing 2-fluoro-2,2-dinitroethyl acrylate which comprises reacting a member selected from the group consisting of acrylic acid and acrylyl chloride with 2-fluoro-2,2-dinitro-ethanol in the presence of a condensation catalyst.

17. The method of claim 16 wherein the condensation catalyst is polyphosphoric acid.

18. The method of claim 16 wherein the reaction is carried out in the presence of chloroform.

References Cited by the Examiner

UNITED STATES PATENTS

| | | | |
|---|---|---|---|
| 2,967,195 | 1/1961 | Gold | 260—486 |
| 2,978,455 | 4/1961 | Frankel | 260—486 |

LORRAINE A. WEINBERGER, *Primary Examiner.*

L. D. ROSDOL, CARL D. QUARFORTH, *Examiners.*

J. W. WHISLER, L. A. SEBASTIAN,
*Assistant Examiners.*